Figures 1, 2:
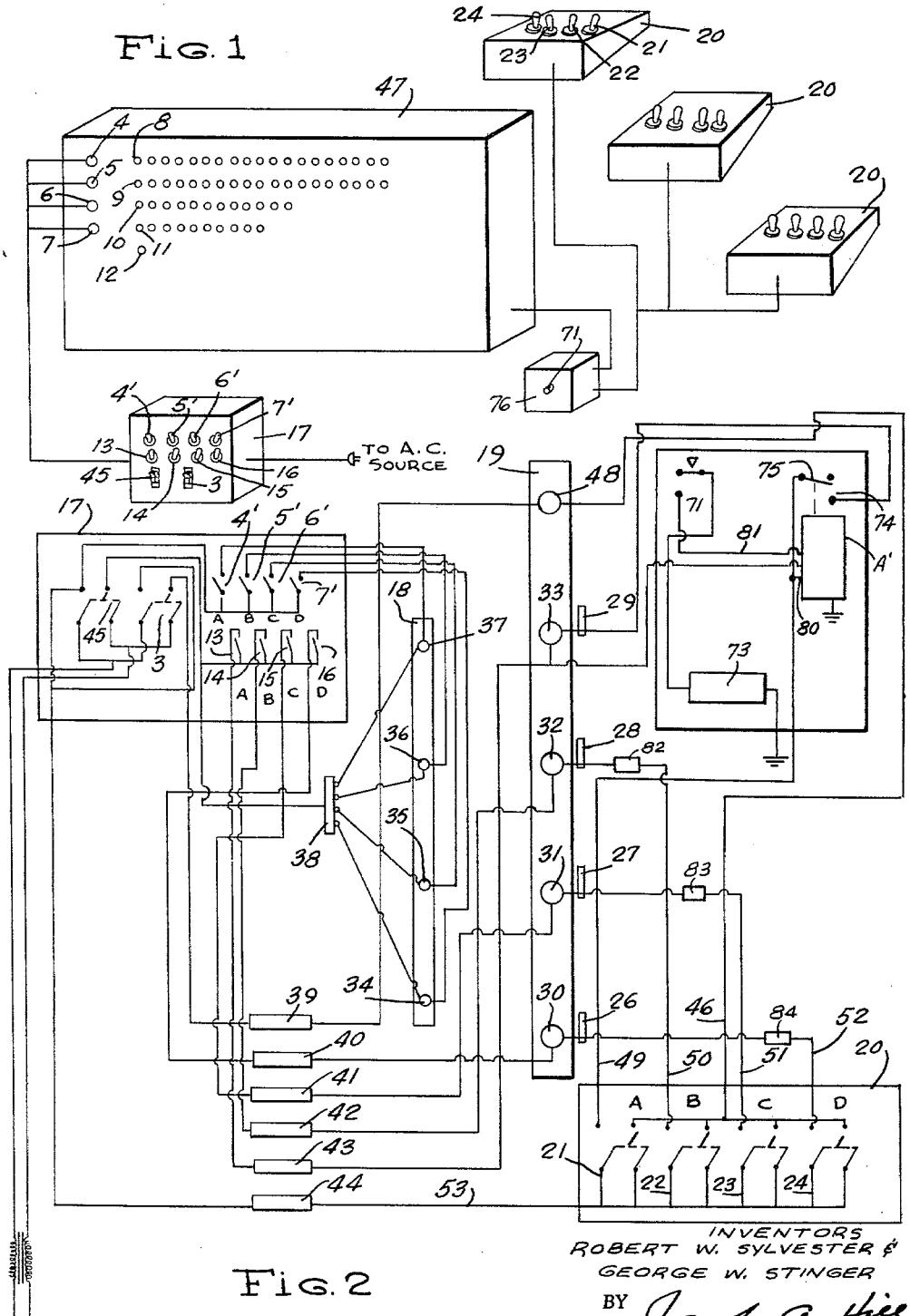

INVENTORS
ROBERT W. SYLVESTER &
GEORGE W. STINGER
BY Joseph A. Hill
ATTORNEY

United States Patent Office 3,199,230
Patented Aug. 10, 1965

3,199,230
STUDENT TEACHING DEVICE
Robert W. Sylvester, 1504 Cavalier Corridor, Falls Church, Va., and George W. Stinger, Korea (1st Base P.O., APO 971, San Francisco, Calif.)
Filed May 17, 1963, Ser. No. 281,370
4 Claims. (Cl. 35—48)
(Granted under Title 35, U.S. Code (1952), sec. 266)

The invention described herein may be manufactured and used by or for the Government for governmental purposes without the payment to us of any royalty thereon.

This invention relates to a device for teaching students when the subject involved can be taught in the form of multiple choice questions or true or false questions. One of the main problems in teaching matter of this kind is student participation. If the questions are given orally and the instructor waits for an answer, usually only a few of the brighter students will participate and answer the questions. Some students will not answer the question unless prodded. Also, by using the conventional methods of teaching the instructor has no way to tell exactly how each student is doing as the questions are given. He may know how the class is doing generally but in larger classes he will not know whether a particular student is grasping the point of the lecture.

Previously, the written examination has been used extensively as a measure of how well each particular student was doing. These examinations sometimes are quite lengthy and require a great deal of time to correct.

It is the principal object of this invention to provide a teaching device which will give the instructor an immediate answer as to how each student is doing.

A further object of this invention is to provide a teaching machine which will give each student's response to a particular question, the response to be transmitted to a control board before the instructor.

Another object of this invention is to provide a teaching device which will let the instructor know when all the students have selected an answer.

Another object of this invention is to provide a teaching device wherein a signal indicates to the instructor that the student has chosen an answer and such signal is interlocked with an indicator signifying the student's choice of answer.

Still another object of this invention is to provide a device for teaching which will allow the correct answer selection to be flashed to all the students after each has made his selection.

Another object of this invention is to provide means for freezing the student's choice so that he cannot change his selection upon finding the correct answer which the instructor indicates.

Essentially, this invention is comprised of a panel board which will indicate when a student has made his selection of an answer and what that selection is, and a control panel on each student's desk on which he makes his selections. Also, connected to the panel board is a device known as the instructor control panel. This instructor control panel comprises a series of switches which enable the instructor to initiate control of the energization of the circuits for each selection possibility and then have at his disposal a light for each student telling him of each student's selection. Two other aspects of the instructor control panel are the "freezing control" and the correct answer display control.

The "freezing control" allows the instructor to freeze a student's selection after a period of time. This prevents the student from changing his answer after he finds out the correct answer from the correct answer display. "Freezing" of the student's response does not have to be a set time limit that is identical for each question because some questions take longer to read and are more difficult to answer than others. The time allowed the students to answer is controlled by the instructor and is as long as he feels it should be for a particular class and question. To begin with the students are given a question with a series of answer choices. After displaying the question with the various answer choices to the students either on a blackboard, printed sheets, or orally he then allows the students time to select an answer and indicate that selection by pressing a selector button on the student control panel. When this time has elapsed the instructor then "freezes" the responses by throwing a switch on a control panel which connects the electrical energizing source from the student's control boxes and permits the light signifying the student's choice to be lit.

The panel board has on one side a series of lights for each student which identifies the student by the number of his desk or by the student's name. These lights are arranged in five horizontal rows across the panel board with each row representing a particular selection that can be made by the student such as 1, 2, 3, 4, 5, or A, B, C, D, E. Each horizontal row has as many lights as there are students and the lights of these five rows are also arranged in vertical rows giving a rectangular lattice arrangement to the series of lights. Each student is designated a particular vertical row of lights and his selection will be indicated in one of the five lights in his particular vertical row. Only the instructor can see this rectangular lattice of lights because it is on the side of the panel board facing the instructor.

On the opposite side of the panel board, the side that faces the students, there are five lights that are labelled according to the various selection of answers available to the student such as A, B, C, D, E. The purpose of these lights is to relay to the whole class the correct answer after every student has made his selection and the instructor has frozen the selections.

A horizontal row of colored lights such as green lights are wired to the master panel on the side visible only to the instructor to indicate when a student has made a selection. A quick glance down this horizontal row would show when all or most of the students has made a selection. One of the main advantages of this invention is that it allows the instructor to tell at a glance when the students have answered without having to look at each particular student's answer.

The invention will be more particularly described with reference to the following drawings wherein:

FIG. 1 is a perspective view showing the physical relationship of the panel board, the student control panels, and the instructor control panels; and FIG. 2 is a circuit diagram showing the electrical relationship between the panel board, the student control panels, and the instructor control panels.

In FIG. 1 a large panel board 47 is located at the front of the class and has a series of horizontal rows of lights which face the instructor. These lights also form vertical rows with each student assigned a vertical row either by name or number. The number of vertical rows can be increased or decreased to meet the particular needs of any class. The top horizontal row of lights indicate when the student has answered the question but does not indicate what the answer is. The purpose of this top row of lights of which the first light is shown by reference 8 is to indicate when the majority of students have chosen an answer. Were it not for this row of lights which can be colored such as green the instructor would have to look down each vertical column to tell if all of the students had made a selection. The four horizontal rows beneath the top row of colored lights are to indicate what the selection made by each student is. Only the first vertical row of lights or the lights for number 1 student have been numbered for clarity. These lights are 9, 10, 11 and 12 and represent the four possible selections which a student can make. The panel board housing may be provided with storage compartments in the lower portion thereof to store the instructor and student control boxes when they are not in use.

The selections are made by the students on a student control panel one of which is located on each desk. As can be seen from FIG. 1 each of these student control panels 20 has four selections possible. Each selection is made by engaging one of four switches which corresponds to a particular answer such as A, B, C, or D of a multiple choice question. Each response from these student control panels is fed into the panel board and lights the corresponding light of the particular student and, through the instructor's control box 76, energizes the light corresponding to a particular answer.

Jacks 4, 5, 6, and 7 on the panel board are for inserting the leads from the instructor control panel 17. Input to the instructor control panel is a 110 v. A.C. power source. The instructor control panel is comprised of a metal housing which forms the support for ten switches. Switches 13, 14, 15 and 16 are single pole single throw switches which close the circuit on the response made by the students. Each of these switches represents a selection that can be made by the student and when a switch is engaged such as switch 13, it will permit completing the circuit to all the lights in a horizontal row such as selection A. Similarly, switches 14, 15 and 16 will also permit completing the circuit to all the lights in the respective horizontal rows which they control. At this point it might be well to say that each light which forms the vertical and horizontal rows has three breaks in its circuit, one is the switch on the student control panel, another is the relay operated contact 75 and the other is the switch on the instructor control panel 13, 14, 15, 16. All of these switches must be closed before the light can be energized. Each light in a particular row, excluding the green light in the top row has a corresponding switch at a student's desk. For instance light 9 which indicates selection A has been made is controlled by switch 21 on the student control panel and also by switch 13 on the instructor control panel. Instead of having a separate switch for each light as in the student control panels, the instructor control panel has one complete horizontal row of lights ganged together into one switch.

Switches 4', 5', 6' and 7' control four lights which will be called "correct answer lights." These lights are on the side of the panel board which faces the students. These lights are not shown in FIG. 1 but are simply four lights labelled such as A, B, C, and D. The purpose of the correct answer lights is to inform the student what the correct answer is after each has made a selection and that selection seen by the instructor. Students learn more rapidly if they are informed of the correct answer after they have made an irrevocable choice of an answer. It allows the student to make a comparison of his answer with the correct answer almost immediately. The "correct answer" switches 4', 5', 6' and 7' are not connected in with the student control panels and are used mainly as a signalling device to relay the correct answer to the side of the panel board facing the students. All four of the "correct answer" switches are single pole single throw switches.

Switches 3 and 45 are double pole single throw switches and control the green lights and also the indicator lights on both sides of the panel board. Their function will be explained in a subsequent paragraph.

FIG. 2 shows the electrical diagram of one student control panel, one vertical row of lights on the panel board, the "correct answer" lights, the instructor control panel and the components and connections for the freezing circuit. Only one student control panel, only one vertical row of indicator lights and a freezing circuit for light 33 activated by the student control panel 20 are used in the explanation for the sake of clarity. It is to be understood that there may be any number of student control panels and freezing circuits and a corresponding number of vertical rows of indicator lights on the panel board within the spirit and scope of this invention. Multiple terminals 26, 27, 28 and 29 shows that as many student control panels as are needed can be wired to these terminals, with a corresponding number of indicator lights also wired to these terminals. Indicator lights 30, 31, 32 and 33 and also green light 48 comprise a vertical row of lights on the panel board for a particular student control panel 20.

Panel board 19 represents a row of vertical lights on the side of the panel board facing the instructor and panel board 18 represents the opposite side of the panel board or the side facing the students. Lights 34, 35, 36 and 37 are the "correct answer" lights and are labelled according to the answer selections available to the students. A series, which may be any desired number, of post terminals 39, 40, 41, 42, 43 and 44 connect the student control panels and the master instructor control panel to the vertical rows of lights. Numeral 38 is a multipost terminal connecting the "correct answer" lights to the instructor control panel.

In FIG. 2 the student control panel is shown as 20. This is only one of the many student control panels which are constructed alike. Enclosed within a housing are four double pole single throw switches 21, 22, 23 and 24 on which the student makes his answer selection. Negative lead 53 is connected to each of these four switches. When the switches are closed each switch makes contact with two leads, one of which is lead 46 which controls the current to the green light and the other is one of indicator light leads 49, 50, 51 and 52. This allows one switch movement by the student to show two things; one that he has answered the question as indicated by the green light and two, what that answer is as indicated by one of the indicator lights in the vertical rows on the panel board upon actuation of relay A'.

The electrical arrangement of the instructor control panel is in the upper left hand corner of FIG. 2. Switch 3 is a double pole single throw switch which opens and closes the circuit on the green lights across the top of the panel board. When this switch is closed and any one of the four switches on the student control panel is closed the green light on the panel board corresponding to this student will light indicating that he has made his selection. All the green lights on the top horizontal row of lights can be put out merely by opening the circuit to them by means of switch 3. Since switch 3 only controls the green lights they can be turned on and off at will without respect to the remaining lights in the vertical rows on the panel board.

Switch 45 is also a double pole single throw switch but it controls the "correct answer" lights on the student's side of the panel board and also the answer indicator lights on the instructor's side of the panel board. By closing switch 45, eight more switches are put in the circuit. Switches 4', 5', 6' and 7' which control the "correct answer" lights are put in circuit as well as switches 13, 14, 15 and 16 controlling the indicator lights. The instructor can tell which answer a student has selected by closing switch 45, switches 13, 14, 15 and 16 and the switches controlling relay A' such as switch 71. For instance, if a student has made a selection such as answer "C" to the question by depressing switch 23 in the student's control panel, this answer selection will be indicated on the panel board when the instructor closes switch 45, switch 15 and a switch similar to 71 to control a relay similar to A' to complete the circuit from switch 23 to light C. If switch 71 controlled a relay A' for each control panel 20, as hereinafter explained, then operating switch 71 will light all the "C" selections. If this is the wrong answer and the instructor wants to indicate to the students what the correct answer is he can do this by closing switch 45 and closing the appropriate switch among switches 4', 5', 6' and 7' which will energize the light corresponding to the correct answer. Suppose the correct answer were "D," then the instructor would close switch 7' labelled "D" thereby indicating the correct answer to the students. Switches 3 and 45 are master switches which must be on before the teaching device can operate. They are separated so that the green response lights and the answer indicator lights can be used together or independently of one another.

Switch 71 in FIG. 1 is utilized by the instructor to "freeze" the response of the student and to "clear" the panel. The "freezing circuit" is shown in FIG. 2 for the freezing of the response of the student on control panel 20 for "answer A." After student control panel 20 has switch 21 corresponding to "answer A" closed, which closing sends a first electrical impulse through lead 80 to a conventional sequence notching relay A', the instructor may freeze this response by closing switch 71 which sends a second impulse through lead 81 to sequence notching relay A'. This energizes relay A' which closes switch 75 which in turn energizes the answer light 33 corresponding to "answer A." Relay A' may be manually or electrically reset and it is a conventional item. No novelty is claimed in the relay itself. Box 76 contains switches 71 only. The relay A' is located in panel board 47. A relay is required for each of the selector switches A, B, C, D for each student. These relays are shown schematically as 82, 83 and 84. The circuit shown in FIG. 2 is for the A light only but by providing more contactors, i.e., for B, C and D lights, 32, 31 and 30, operated by relay A', switch 71 can freeze any selection on a single control box 20. Switch 71 could be a gang type switch to control as many relays as there are switches on the control panels 20 so that operating the one switch 71 will freeze the selection by the student at any instant of time on each panel 20 by movement of a contactor such as 75 to the position, terminal 74, permitting completion of the circuit from the selector switches 21, 22, 23 or 24 through the relay contactor to the particular light, A, B, C, or D.

To better understand the operation of the student teaching device an example will be taken through from start to finish. The question presented to the students is: The capitol of Montana is: A. Cheyenne, B. Gardner, C. Butte or D. Helena. Student number 20 in the class thinks that Butte is the capitol of Montana and so presses switch 23 indicating that he has selected answer "C." When he does this two circuits are closed simultaneously by the double pole switch and a first impulse is sent to sequence notching relay A'. Lead 46 is connected to negative lead 53 through the switch so the green lights are in circuit as far as the student control panel is concerned. The answer light "C" or 31 will not be lit until the instructor actuates the freeze circuit by means of switch 71 to send a second impulse to the notching relay A' to energize relay A' completing the circuit to the "C" light, 31, through movement of the relay contactor to a terminal corresponding to 74 in the A light circuit to complete the circuit from student control switch 23 through lead 51 to light 31. Having frozen the student's selections the instructor can then evaluate the answer selected. By closing switches 3, 45, and switches 4', 5', 6' and 7' the panel board can be put in circuit. Because switch 3 is closed and student number 20 has made a selection, the breaks in the circuit are closed and the twentieth green light in the top horizontal row will light and tell the instructor that student number 20 has made his selection. If there were no green light shining at position 20 it would indicate that the student did not make a selection. By looking at vertical row number 20, the instructor sees that light "C" is lit showing that student number 20 has made an incorrect selection of an answer, in choosing Butte as the capitol of Montana instead of Helena. To indicate to the class what the correct answer is, the instructor closes switch 7' which lights a single light on the side of the panel board facing the students, said light being labelled "D." By looking at the question again student number 20 can see immediately that he incorrectly chose Butte as the capitol of Montana when the answer should have been Helena. This instantaneous comparison will give a student a greater chance to grasp the subject matter being taught than if he had to wait for a long period of time until the instructor had graded the test papers. Although the explanation of the operation of the student teaching device appears lengthy, the operation itself is quite simple and may only take a matter of 15 or 20 seconds from the time the question s given until the selections have been indicated to the instructor and the correct answer flashed to the students.

It is to be understood that the number of student control panels, shown as well as the number of selections the student has on his control panel is optional and still within the scope of this invention.

We claim:
1. A device for teaching students comprising:
(a) a panel board,
(b) a lattice arrangement of indicator lights on one side of said panel board, said lattice arrangement including a horizontal row of lights for each possible answer, and a vertical row for each student,
(c) a single horizontal row of response lights mounted on said panel board on the side having said lattice arrangement of indicator lights, said row of response lights having a light for each student,
(d) a series of correct answer lights mounted on said panel board on the side opposite from said response and indicator lights,
(e) an instructor control panel electrically connected to said panel board including switching means for making and breaking the circuit of each of said response lights, indicator lights, correct answer lights, and
(f) a student control panel comprising a series of switches each of which represents a possible answer, each of said switches electrically connected to said panel board to simultaneously control a pair of said response and indicator lights on said panel board, and
(g) control means electrically interconnected between said indicator lights and said student control panel for selectively completing a circuit between said indicator lights and said student control panel.

2. A device for teaching students as claimed in claim 1 wherein the student control panel includes a series of double pole single throw switches wired into the negative lead for said indicator and response lights, each of said switches having one pole wired to control an indicator light and the other pole to control a response light.

3. A device for teaching students as claimed in claim 1 wherein the instructor control panel includes:
(a) a first series of switches, wired in the circuit of said indicator lights, each of said first series of switches controlling a complete horizontal row of said indicator lights,
(b) a second series of switches each of which is wired in the circuit of said correct answer lights,
(c) a master response switch wired in the circuit of said response lights, said switch controlling the complete horizontal row of response lights, and (d) a master indicator and correct answer switch, said switch capable of cutting off current from a common source to said indicator and correct answer lights.

4. A device for teaching students as claimed in claim 1 wherein said control means referred to in subparagraph (g) includes an electrical bypass for selectively completing a circuit between one of said indicator lights and said student control panel and for removing the correct indicator switch of said student control panel from a circuit between a power source and said indicator lights.

References Cited by the Examiner

UNITED STATES PATENTS

| | | | |
|---|---|---|---|
| 1,650,247 | 11/27 | Turck | 235—52 |
| 2,050,805 | 8/36 | Pumar | 35—9 |
| 2,562,179 | 7/51 | Dorf | 35—48 |
| 2,654,163 | 10/53 | Reynolds | 35—9 |

EUGENE R. CAPOZIO, *Primary Examiner.*

LAWRENCE CHARLES, JEROME SCHNALL,
*Examiners.*